W. SNIFF.
Sausage Machine.
No. 18,778.
Patented Dec. 1, 1857.
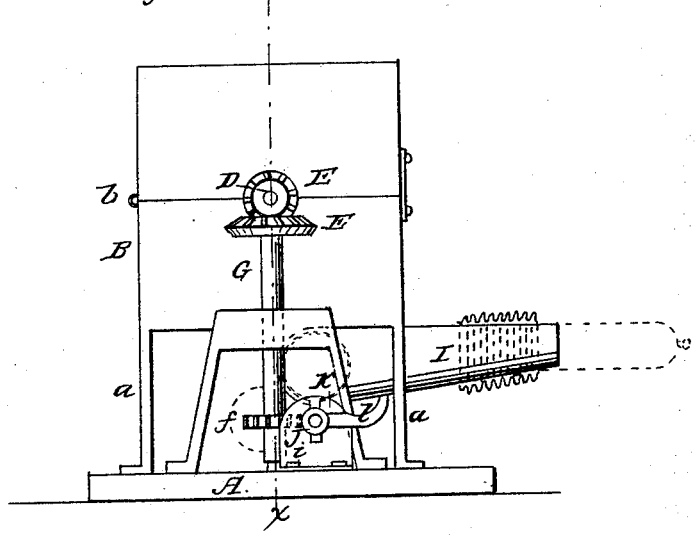
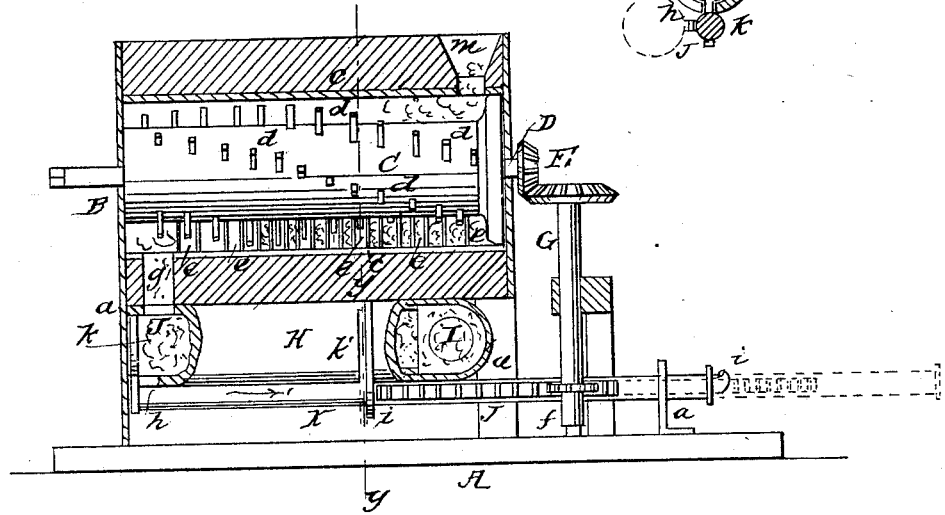

UNITED STATES PATENT OFFICE.

W. SNIFF, OF FULTONHAM, OHIO.

SAUSAGE-MACHINE.

Specification of Letters Patent No. 18,778, dated December 1, 1857.

*To all whom it may concern:*

Be it known that I, W. SNIFF, of Fultonham, in the county of Muskingum and State of Ohio, have invented a new and Improved Machine for Making Sausages; and I do hereby declare that the following is a full, clear, and exact description of the same, reference being had to the annexed drawings, making a part of this specification, in which—

Figure 1 is a longitudinal vertical section of my improvement taken in the line $(x)$ $(x)$ Fig. 2. Fig. 2 is an end view of ditto. Fig. 3 is a transverse vertical section of the stuffing cylinder and plunger rod taken in the line $(y)$ $(v)$ Fig. 1.

Similar letters of reference indicate corresponding parts in the several figures.

The object of this invention is to make sausages direct from the meat and other substances or materials used, at one operation. The invention consists in combining a cutting and stuffing device as hereinafter described whereby said devices may, from one and the same shaft, be operated simultaneously and conjointly, so that the meat and other substances which are generally used may, as they are cut of the proper degree of fineness, be forced into the usual cases.

To enable those skilled in the art to fully understand and construct my invention, I will proceed to describe it.

A represents a horizontal bed-piece on which a rectangular box B is supported by uprights $(a)$. The box B is formed of two parts connected by hinges $(b)$ and each part contains a semi-cylindrical concave $(c)$, the two concaves when the box is closed forming a hollow cylinder in which a drum C, is placed, the shaft or axis D of which, has its bearings in the ends of the lower part of the box. The drum C, has teeth $(d)$, projecting from its periphery, said teeth being placed in spiral rows extending from one end of the cylinder to the other, the cylinder being equal in length to the box B, see Fig. 1. In the lower part of the box B, or rather in the lower concave and at one side there is placed a series of stationary metal plates $(e)$. These plates are all parallel with each other, and are placed at equal distances apart sufficient space being allowed between them to allow the teeth $(d)$ to work or pass between them as the drum C rotates, see Fig. 1.

To one end of the shaft or axis D there is attached a bevel wheel E which gears into a wheel F at the upper end of a shaft G, the lower end of which is stepped in the bed-piece A. This shaft has a pinion $(f)$ on its lower end.

To the under side of the box B there is attached a cylindrical chamber or trunk H, one end of which communicates with the interior of the box B by a passage $(g)$. The opposite end of this trunk has a nozzle I, attached to it at right angles and a plunger J, is fitted within said trunk, the plunger being allowed to work freely within the trunk. The plunger is attached to a rod K by means of an eye $(h)$, the rod being at the outer side and below the cylindrical trunk H, and fitted in bearings $(i)$ $(i)$ in which the rod is allowed to slide. A rack $(j)$ is attached to one side of the rod K, and the pinion $(f)$ on the shaft G gears into this rack when the plunger J, is fitted within the trunk H. The trunk H has an orifice or slit (K) in its ends near the passage $(g)$ to allow the plunger J to pass through and a slit $(k')$ is made in the trunk H near its junction with the nozzle I, see Fig. 1. To the outer end of the rod K an arm or handle $(l)$ is attached.

The operation is as follows:—The meat and other substances are placed in the box B through an opening (M) at one end of its upper part and motion is given the shaft D in any proper manner. The meat and other substances are cut by the teeth $(d)$ as they pass the edges of the plates $(e)$ and the meat, &c., is fed along within the box to the passage $(g)$ owing to the spiral position of the rows of teeth, and consequently the meat is subjected to the action of each tooth and plate successively as it passes from the opening (M) to the passage $(g)$, and when it reaches the passage $(g)$ it will be cut sufficiently fine. The cut meat passes down through the passage $(g)$ into the trunk H, and the operator by grasping the handle $(l)$ and turning the rod K, turns the plunger J upward through the slit $(k)$ within the trunk H, and by the same movement the rack $(j)$ is thrown in gear with the pinion $(f)$ and the plunger is moved forward within the trunk in the direction indicated by arrow $(e)$ in consequence of the rotation of shaft G and the cut meat is forced by the plunger J, through the nozzle I into the case which is attached to the nozzle. When the plunger J, has reached the outer end of the trunk H the operator turns the plunger J out of the trunk H through the slit (k') and shoves it back to the inner end and again turns it up within the inner end of the trunk to be again moved forward by the pinion and rack, the case being tied as usual to form the sausages, of usual length. In Fig. 2, the case is shown in red.

From the above description of parts it will be seen that the cutting and stuffing devices work conjointly and the process of manufacturing sausages will be much expedited by its use and much labor saved. The machine may be constructed at a trifling expense.

I am aware that teeth or knives have been attached to a rotating drum or cylinder and stationary knives or cutters have been used in connection therewith and placed within a suitable box. I therefore do not claim broadly and separately the cutting device herein shown, nor do I claim broadly the employment of a plunger working within a cylinder or trunk for stuffing cases with sausage meat, for such devices are in common use, although arranged differently from that herein shown and described.

What I claim therefore as new and desire to secure by Letters Patent, is,

The stuffing device formed of the cylindrical trunk H, provided with slots (k) (k') and the plunger J, attached to the rod K, as shown when the above parts are arranged relatively with the box B of the cutting device so that the within described parts may operate conjointly as and for the purpose set forth.

W. SNIFF.

Witnesses:
JOHN S. MILLER,
JOHN R. GRIMSLEY.